(12) United States Patent
Luo et al.

(10) Patent No.: US 9,209,950 B2
(45) Date of Patent: Dec. 8, 2015

(54) ANTENNA TIME OFFSET IN MULTIPLE-INPUT-MULTIPLE-OUTPUT AND COORDINATED MULTIPOINT TRANSMISSIONS

(71) Applicant: QUALCOMM Incorporated, San Diego, CA (US)

(72) Inventors: Tao Luo, San Diego, CA (US); Stefan Geirhofer, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 13/633,103

(22) Filed: Oct. 1, 2012

(65) Prior Publication Data

US 2013/0083780 A1    Apr. 4, 2013

Related U.S. Application Data

(60) Provisional application No. 61/542,644, filed on Oct. 3, 2011.

(51) Int. Cl.
*H04W 72/04* (2009.01)
*H04L 5/00* (2006.01)
(Continued)

(52) U.S. Cl.
CPC ............ *H04L 5/0035* (2013.01); *H04B 7/0417* (2013.01); *H04B 7/0671* (2013.01);
(Continued)

(58) Field of Classification Search
CPC ................................................. H04W 72/0406
USPC ......................................................... 370/336
See application file for complete search history.

(56) References Cited

U.S. PATENT DOCUMENTS 6,771,706 B2    8/2004   Ling et al.
7,720,034 B2    5/2010   Seo et al.
(Continued)

FOREIGN PATENT DOCUMENTS

CN    1291011 A    4/2001
CN    101228711 A    7/2008
(Continued)

OTHER PUBLICATIONS

International Search Report and Written Opinion—PCT/US2012/058471—ISA/EPO—Apr. 18, 2013.
(Continued)

*Primary Examiner* — Ronald B Abelson
(74) *Attorney, Agent, or Firm* — Norton Rose Fulbright US LLP

(57) ABSTRACT

A method for wireless communication is provided which includes receiving first and second signals transmitted from first and second antennas, respectively, determining a time offset between the first and second antennas based on the first and second signals, and reporting information regarding the time offset, including information regarding the time offset as being above or below a predetermined threshold. Another method for wireless communication is provided which includes generating channel state information feedback based on an assumption that the time offset is being compensated at a transmitter side. Yet another method for wireless communication is provided which includes receiving information regarding a time offset between multiple transmit antennas, including information regarding the time offset as being above or below a predetermined threshold, and adapting downlink transmissions to account for the time offset.

58 Claims, 11 Drawing Sheets

(51) Int. Cl.
  *H04B 7/04* (2006.01)
  *H04B 17/10* (2015.01)
  *H04B 17/24* (2015.01)
  *H04B 7/02* (2006.01)
  *H04B 7/06* (2006.01)

(52) U.S. Cl.
  CPC ............ *H04B 7/0673* (2013.01); *H04B 17/104* (2015.01); *H04B 17/24* (2015.01); *H04L 5/0051* (2013.01); *H04L 5/0053* (2013.01); *H04W 72/0406* (2013.01); *H04W 72/0413* (2013.01); *H04W 72/0446* (2013.01); *H04B 7/024* (2013.01); *H04B 7/063* (2013.01); *H04B 7/0665* (2013.01)

(56) References Cited

U.S. PATENT DOCUMENTS

| | | | |
|---|---|---|---|
| 8,917,598 | B2 | 12/2014 | Ho et al. |
| 2003/0148738 | A1 | 8/2003 | Das et al. |
| 2007/0002963 | A1 | 1/2007 | Pedersen et al. |
| 2008/0227453 | A1* | 9/2008 | Somasundaram et al. .... 455/436 |
| 2010/0316094 | A1 | 12/2010 | Tung |
| 2011/0002410 | A1 | 1/2011 | Forenza et al. |
| 2011/0085460 | A1* | 4/2011 | Zhang et al. .................. 370/252 |
| 2011/0176477 | A1 | 7/2011 | Lee et al. |
| 2011/0201368 | A1 | 8/2011 | Faccin et al. |
| 2015/0131634 | A1 | 5/2015 | Luo et al. |

FOREIGN PATENT DOCUMENTS

| | | |
|---|---|---|
| EP | 1079543 A1 | 2/2001 |
| WO | WO-02078211 A2 | 10/2002 |
| WO | WO-2009086195 | 7/2009 |

OTHER PUBLICATIONS

Partial International Search Report—PCT/US2012/058471—ISA/EPO—Jan. 2, 2013.

* cited by examiner

ANTENNA TIME OFFSET IN MULTIPLE-INPUT-MULTIPLE-OUTPUT AND COORDINATED MULTIPOINT TRANSMISSIONS

CROSS-RELATED APPLICATIONS

The present application for patent claims priority to Provisional Application No. 61/542,644 entitled "ANTENNA TIME OFFSET IN MULTIPLE-INPUT-MULTIPLE-OUTPUT AND COORDINATED MULTIPOINT TRANSMISSION" filed Oct. 3, 2011, and assigned to the assignee hereof and hereby expressly incorporated by reference herein for all purposes.

BACKGROUND

1. Field

Aspects of the present disclosure relate generally to wireless communication systems, and more particularly, to antenna time offset in multiple-input-multiple-output (MIMO) transmission and in coordinated multipoint (CoMP) transmission.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

In MIMO, a time offset may exist between transmit antennas of a single transmission point (e.g., single cell/base station MIMO) which may degrade MIMO performance. In coordinated multipoint (CoMP) transmission, multiple base stations (e.g., multiple transmission points) may participate in simultaneous coherent downlink transmission to a UE. Coherent joint CoMP may require time synchronization between the base stations. However, a time offset may also exist between these base stations which may degrade CoMP performance. Thus, there is a need for reporting and accounting for the time offset between multiple transmit antennas to address these issues.

SUMMARY

In an aspect, a method of wireless communication includes receiving first and second signals transmitted from first and second antennas, respectively, determining a time offset between the first and second antennas based on the first and second signals, and reporting information regarding the time offset between the first and second antennas, wherein the reporting includes reporting the time offset as being above or below a predetermined threshold.

In another aspect, a method of wireless communication includes receiving downlink transmissions transmitted from first and second antennas, generating channel state information (CSI) feedback with respect to the downlink transmissions, and sending the CSI feedback to a base station. The CSI feedback is conditioned based on whether or not a time offset between the first and second antennas is being compensated.

In another aspect of the disclosure, an apparatus for wireless communication includes means for receiving first and second signals transmitted from first and second antennas, respectively, means for determining a time offset between the first and second antennas based on the first and second signals, and means for reporting information regarding the time offset between the first and second antennas, wherein the reporting includes reporting the time offset as being above or below a predetermined threshold.

In yet another aspect of the disclosure, an apparatus for wireless communication includes means for receiving downlink transmissions transmitted from first and second antennas, means for generating channel state information (CSI) feedback with respect to the downlink transmissions, and means for sending the CSI feedback to a base station. The CSI feedback is conditioned based on whether or not a time offset between the first and second antennas is being compensated.

In still another aspect, a computer program product for wireless communications in a wireless network includes a non-transitory computer-readable medium having program code recorded thereon. The program code includes program code to receive first and second signals transmitted from first and second antennas, respectively, program code to determine a time offset between the first and second antennas based on the first and second signals, and program code to report information regarding the time offset between the first and second antennas, wherein the information includes information regarding the time offset as being above or below a predetermined threshold.

In another aspect, a computer program product for wireless communications in a wireless network includes a non-transitory computer-readable medium having program code recorded thereon. The program code includes program code to receive downlink transmissions transmitted from first and second antennas, program code to generate channel state information (CSI) feedback with respect to the downlink transmissions, and program code to send the CSI feedback to a base station. The CSI feedback is conditioned based on whether or not a time offset between the first and second antennas is being compensated.

In yet another aspect, an apparatus configured for wireless communication includes at least one processor and a memory coupled to the at least one processor. The at least one processor is configured: to receive first and second signals transmitted from first and second antennas, respectively; to determine a time offset between the first and second antennas based on the first and second signals; and to report information regarding the time offset between the first and second antennas, wherein the information includes information regarding the time offset as being above or below a predetermined threshold.

In another aspect, an apparatus configured for wireless communication includes at least one processor and a memory coupled to the at least one processor. The at least one processor is configured: to receive downlink transmissions transmitted from first and second antennas; to generate channel state information (CSI) feedback with respect to the downlink transmissions; and to send the CSI feedback to a base station. The CSI feedback is conditioned based on whether or not a time offset between the first and second antennas is being compensated.

In another aspect, a method for wireless communication includes receiving information regarding a time offset between multiple transmit antennas, wherein the information includes information regarding the time offset as being above or below a predetermined threshold, and adapting transmissions to account for the time offset.

In still another aspect, an apparatus for wireless communication includes means for receiving information regarding a time offset between multiple transmit antennas, wherein the information includes information regarding the time offset as being above or below a predetermined threshold, and means for adapting transmissions to account for the time offset.

In another aspect, a computer program product for wireless communications includes a non-transitory computer-readable medium having program code recorded thereon. The program code includes program code to receive information regarding a time offset between multiple transmit antennas, wherein the information includes information regarding the time offset as being above or below a predetermined threshold, and program code to adapt transmissions to account for the time offset.

In yet another aspect, an apparatus configured for wireless communication includes at least one processor and a memory coupled to the at least one processor. The at least one processor is configured: to receive information regarding a time offset between multiple transmit antennas, wherein the information includes information regarding the time offset as being above or below a predetermined threshold; and to adapt transmissions to account for the time offset.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
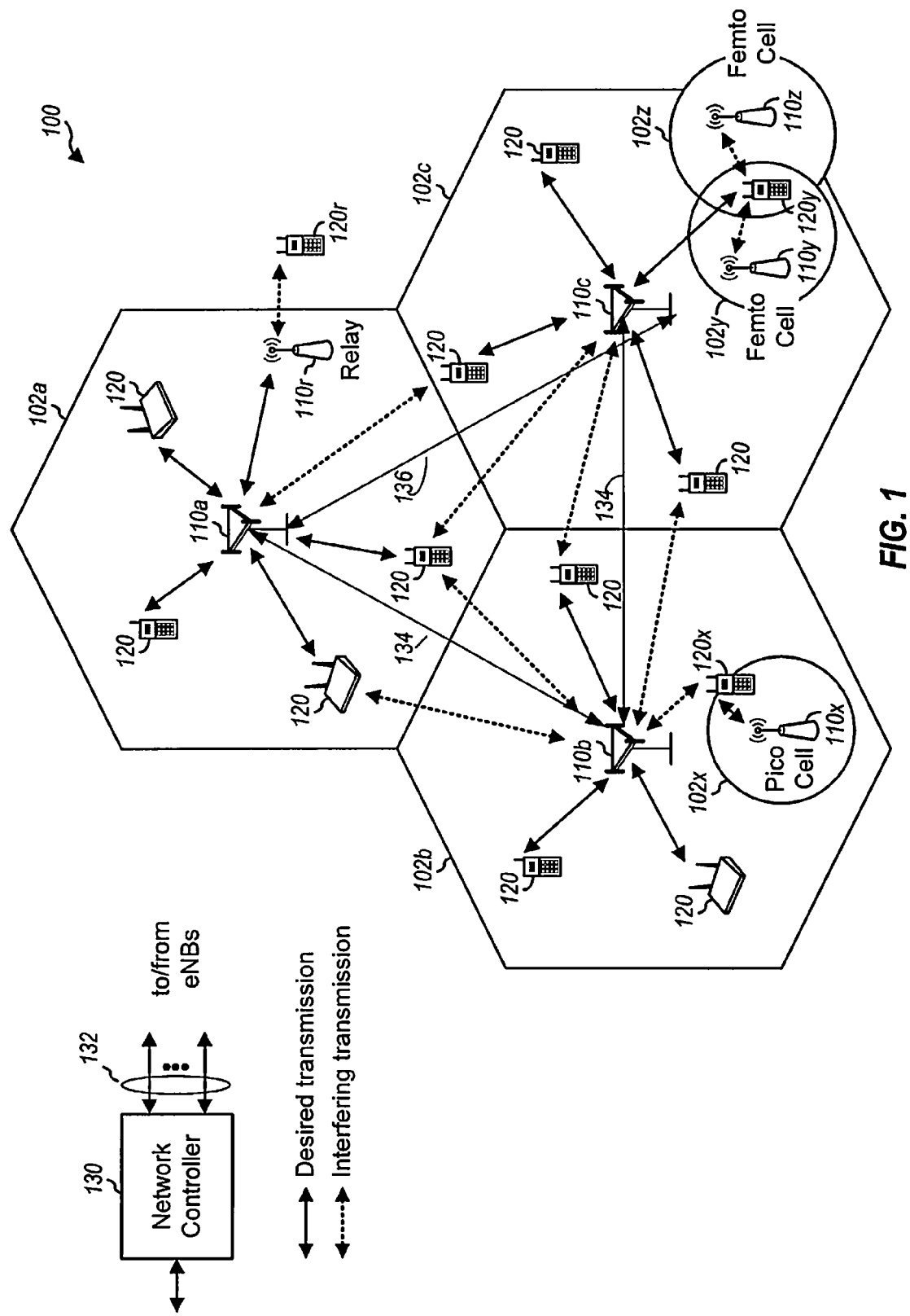
FIG. 1 is a block diagram illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

A network controller 130 may couple to a set of eNBs and provide coordination and control for these eNBs. The network controller 130 may communicate with the eNBs 110 via a backhaul 132. The eNBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively.

Figure 2:
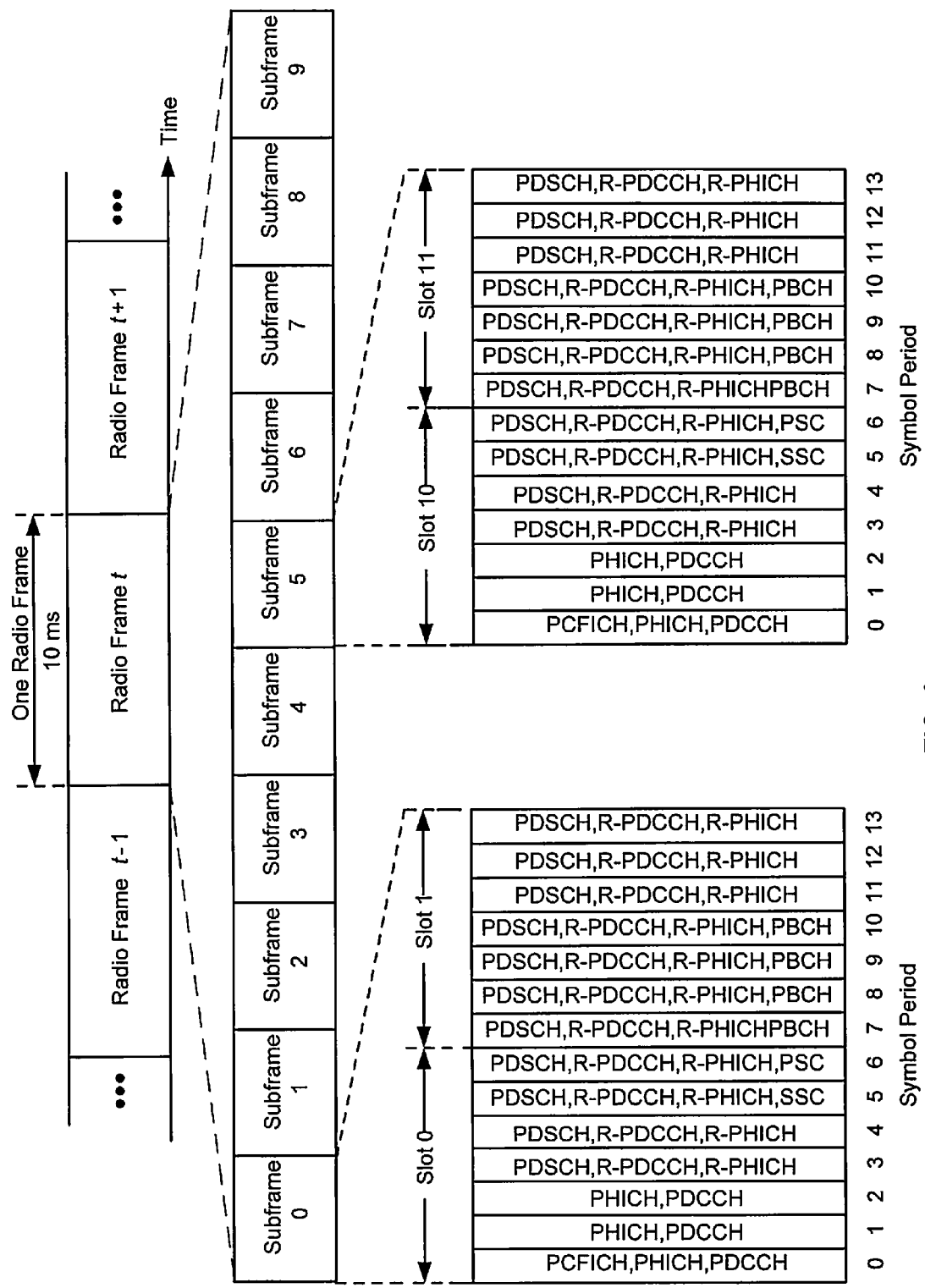
FIG. 2 is a block diagram illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well.

As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
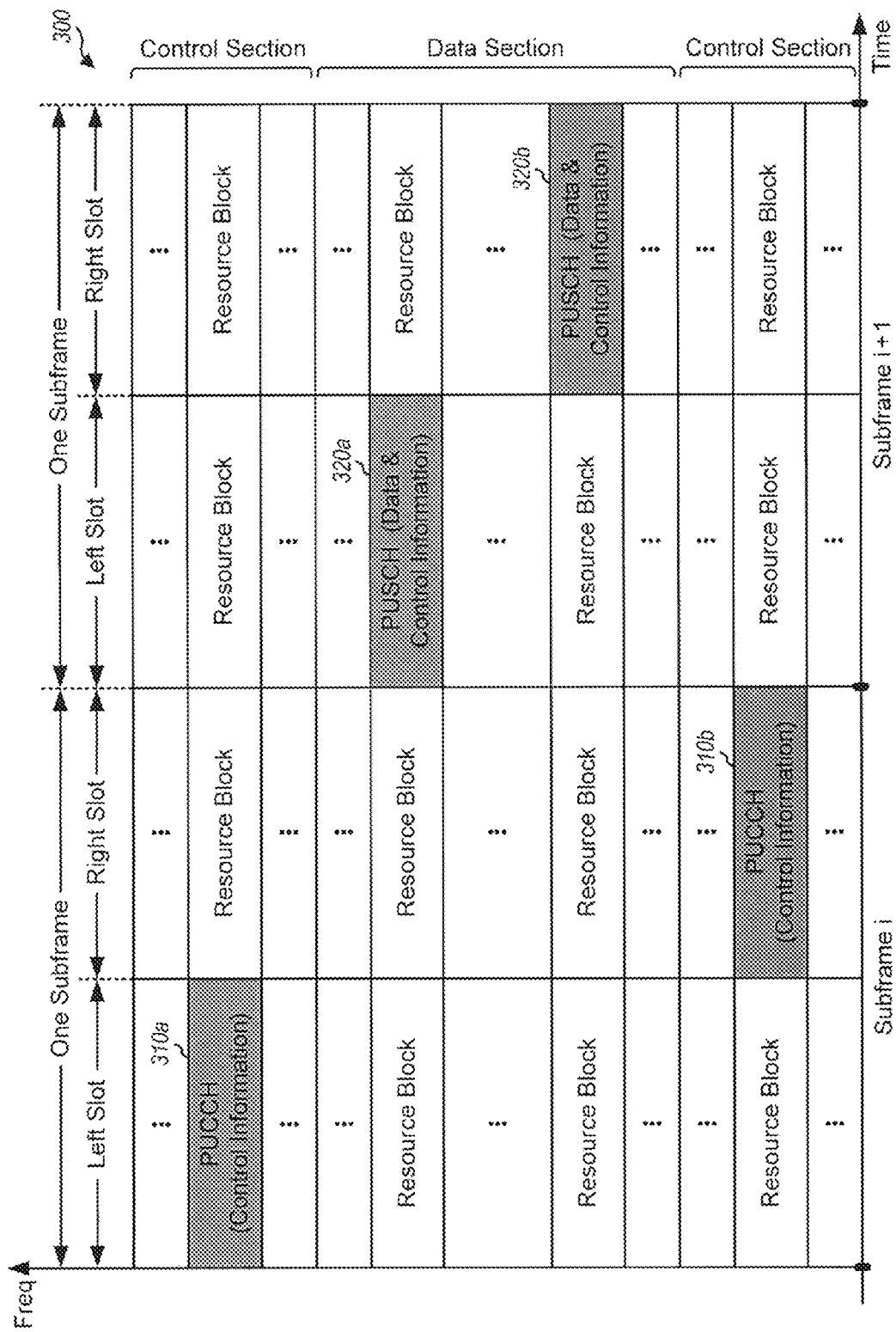
FIG. 3 is a block diagram illustrating an exemplary frame structure in uplink LTE/-A communications.

FIG. 3 is a block diagram conceptually illustrating an exemplary frame structure 300 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks 310$a$ and 310$b$ in the control section. The UE may transmit only data or both data and control information in a Physical Uplink Shared Channel (PUSCH) on the assigned resource blocks 320$a$ and 320$b$ in the data section. An uplink transmission may span both slots of a subframe and may hop across frequency as shown in FIG. 3.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110$a$-$c$ are usually carefully planned and placed by the provider of the wireless network 100. The macro eNBs 110$a$-$c$ generally transmit at high power levels (e.g., 5 W-40 W). The pico eNB 110$x$ and the relay station 110$r$, which generally transmit at substantially lower power levels (e.g., 100 mW-2 W), may be deployed in a relatively unplanned manner to eliminate coverage holes in the coverage area provided by the macro eNBs 110$a$-$c$ and improve capacity in the hot spots. The femto eNBs 110$y$-$z$, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110$y$-$z$ typically also transmit at substantially lower power levels (e.g., 100 mW-2 W) than the macro eNBs 110$a$-$c$.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110$x$, is characterized by a substantially lower transmit power when compared with a macro eNB, such as the macro eNBs 110$a$-$c$. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110$a$-$c$ and the pico eNB 110$x$ implies that, in a mixed deployment, the downlink coverage area of the pico eNB 110$x$ will be much smaller than that of the macro eNBs 110$a$-$c$.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as range extension.

The wireless network 100 achieves this range extension by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources equally between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 4:
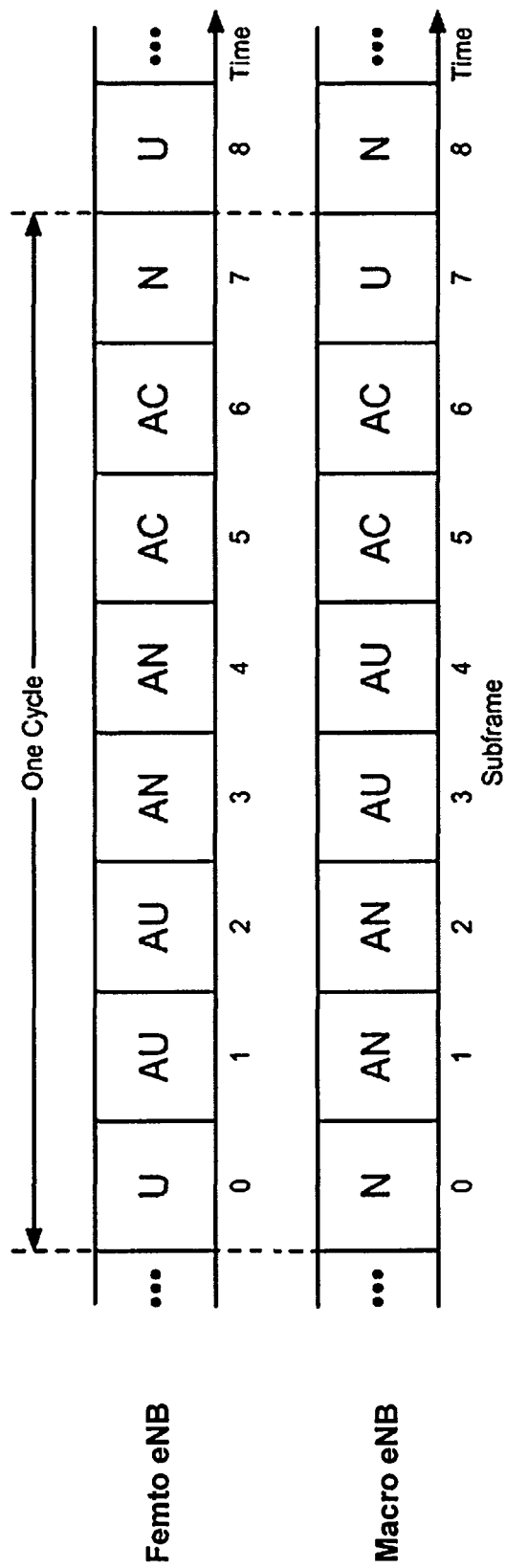
FIG. 4 is a block diagram illustrating time division multiplexed (TDM) partitioning in a heterogeneous network according to one aspect of the disclosure.

FIG. 4 is a block diagram illustrating time division multiplexed (TDM) partitioning in a heterogeneous network according to one aspect of the disclosure. A first row of blocks illustrate subframe assignments for a femto eNB, and a second row of blocks illustrate subframe assignments for a macro eNB. Each of the eNBs has a static protected subframe during which the other eNB has a static prohibited subframe. For example, the femto eNB has a protected subframe (U subframe) in subframe 0 corresponding to a prohibited subframe (N subframe) in subframe 0. Likewise, the macro eNB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). During the dynamically assigned common subframes (AC) in subframes 5 and 6, both the femto eNB and the macro eNB may transmit data.

Protected subframes (such as U/AU subframes) have reduced interference and a high channel quality because aggressor eNBs are prohibited from transmitting. Prohibited subframes (such as N/AN subframes) have no data transmission to allow victim eNBs to transmit data with low interference levels. Common subframes (such as C/AC subframes) have a channel quality dependent on the number of neighbor eNBs transmitting data. For example, if neighbor eNBs are transmitting data on the common subframes, the channel quality of the common subframes may be lower than the protected subframes. Channel quality on common subframes may also be lower for extended boundary area (EBA) UEs strongly affected by aggressor eNBs. An EBA UE may belong to a first eNB but also be located in the coverage area of a second eNB. For example, a UE communicating with a macro eNB that is near the range limit of a femto eNB coverage is an EBA UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities, such as, for example, the network controller 130 (FIG. 1). This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120y may be close to the femto eNB 110y and may have high received power for the eNB 110y. However, the UE 120y may not be able to access the femto eNB 110y due to restricted association and may then connect to the macro eNB 110c (as shown in FIG. 1) or to the femto eNB 110z also with lower received power (not shown in FIG. 1). The UE 120y may then observe high interference from the femto eNB 110y on the downlink and may also cause high interference to the eNB 110y on the uplink. Using coordinated interference management, the eNB 110c and the femto eNB 110y may communicate over the backhaul 134 to negotiate resources. In the negotiation, the femto eNB 110y agrees to cease transmission on one of its channel resources, such that the UE 120y will not experience as much interference from the femto eNB 110y as it communicates with the eNB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 μs (5 km÷3×10$^8$, i.e., the speed of light, 'c'). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 5:
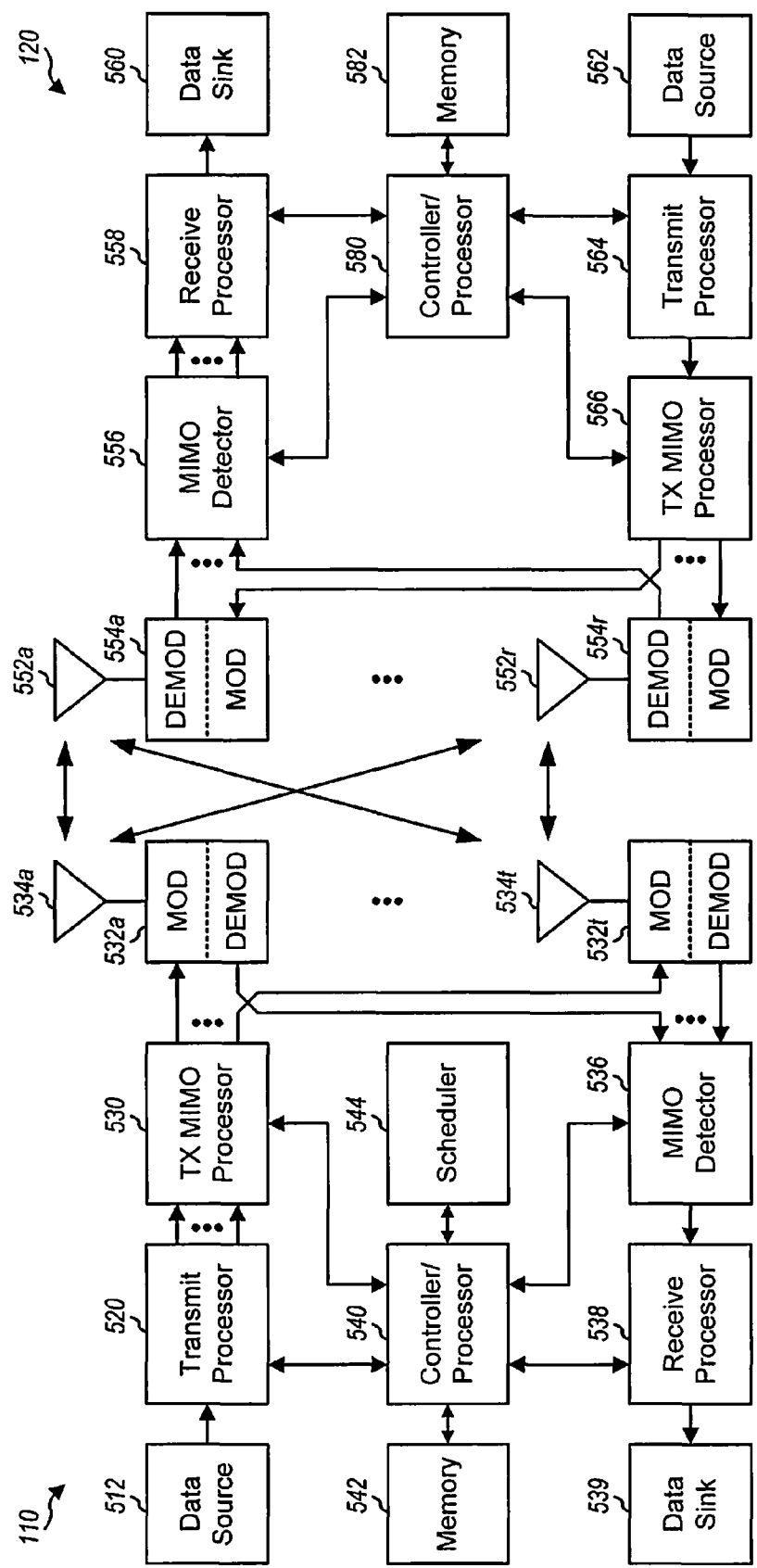
FIG. 5 is a block diagram illustrating a design of a base station/eNB and a UE configured according to one aspect of the present disclosure.

FIG. 5 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 534a through 534t, and the UE 120 may be equipped with antennas 552a through 552r.

At the eNB 110, a transmit processor 520 may receive data from a data source 512 and control information from a controller/processor 540. The control information may be for the PBCH, PCFICH, PHICH, PDCCH, etc. The data may be for the PDSCH, etc. The transmit processor 520 may process (e.g., encode and symbol map) the data and control information to obtain data symbols and control symbols, respectively. The transmit processor 520 may also generate reference symbols, e.g., for the PSS, SSS, and cell-specific reference signal. A transmit (TX) multiple-input multiple-output (MIMO) processor 530 may perform spatial processing (e.g., precoding) on the data symbols, the control symbols, and/or the reference symbols, if applicable, and may provide output symbol streams to the modulators (MODs) 532a through 532t. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink signal. Downlink signals from modulators 532a through 532t may be transmitted via the antennas 534a through 534t, respectively.

At the UE 120, the antennas 552a through 552r may receive the downlink signals from the eNB 110 and may provide received signals to the demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. A MIMO detector 556 may obtain received symbols from all the demodulators 554a through 554r, perform MIMO detection on the received symbols if applicable, and provide detected symbols. A receive processor 558 may process (e.g., demodulate, deinterleave, and decode) the detected symbols, provide decoded data for the UE 120 to a data sink 560, and provide decoded control information to a controller/processor 580.

On the uplink, at the UE 120, a transmit processor 564 may receive and process data (e.g., for the PUSCH) from a data source 562 and control information (e.g., for the PUCCH) from the controller/processor 580. The transmit processor 564 may also generate reference symbols for a reference signal. The symbols from the transmit processor 564 may be precoded by a TX MIMO processor 566 if applicable, further processed by the demodulators 554a through 554r (e.g., for SC-FDM, etc.), and transmitted to the eNB 110. At the eNB 110, the uplink signals from the UE 120 may be received by the antennas 534, processed by the modulators 532, detected by a MIMO detector 536 if applicable, and further processed by a receive processor 538 to obtain decoded data and control information sent by the UE 120. The processor 538 may provide the decoded data to a data sink 539 and the decoded control information to the controller/processor 540.

The controllers/processors 540 and 580 may direct the operation at the eNB 110 and the UE 120, respectively. The controller/processor 540 and/or other processors and modules at the eNB 110 may perform or direct the execution of various processes for the techniques described herein. The controllers/processor 580 and/or other processors and modules at the UE 120 may also perform or direct the execution of the functional blocks illustrated in FIGS. 8-10, and/or other processes for the techniques described herein. The memories 542 and 582 may store data and program codes for the eNB 110 and the UE 120, respectively. A scheduler 544 may schedule UEs for data transmission on the downlink and/or uplink.

Figure 6:
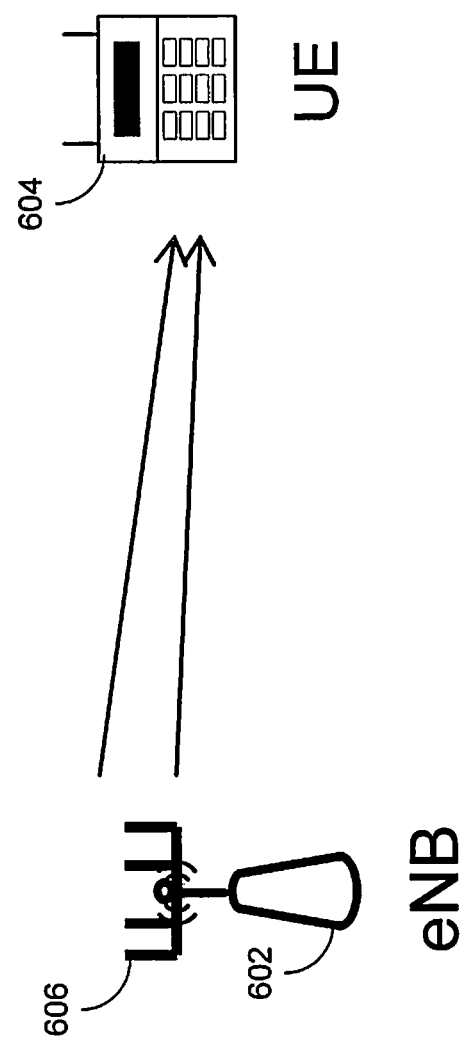
FIG. 6 is a block diagram illustrating a MIMO transmission according to one aspect of the present disclosure.

Referring to FIG. 6, illustrated is a wireless system 600 that includes an eNB 602 and a UE 604. The eNB 602 may be one of the base stations/eNBs in FIG. 1, and the UE 604 may one of the UEs in FIG. 1. The eNB 602 may include multiple transmit antennas 606 for wirelessly communicating with the UE 604 in MIMO transmissions. It has been observed that a time offset may exist between the different transmit antennas 606 of the eNB 602 (e.g., a single transmission point) due to various factors such as varying cable lengths, etc. The time offset between the transmit antennas 606 may degrade MIMO performance since there may be a presumption (e.g., with respect to codebook design) that the transmit antennas are in sync. Accordingly, one approach to address this issue may be to periodically perform time calibration at the eNB 602 which can be costly.

Figure 7:
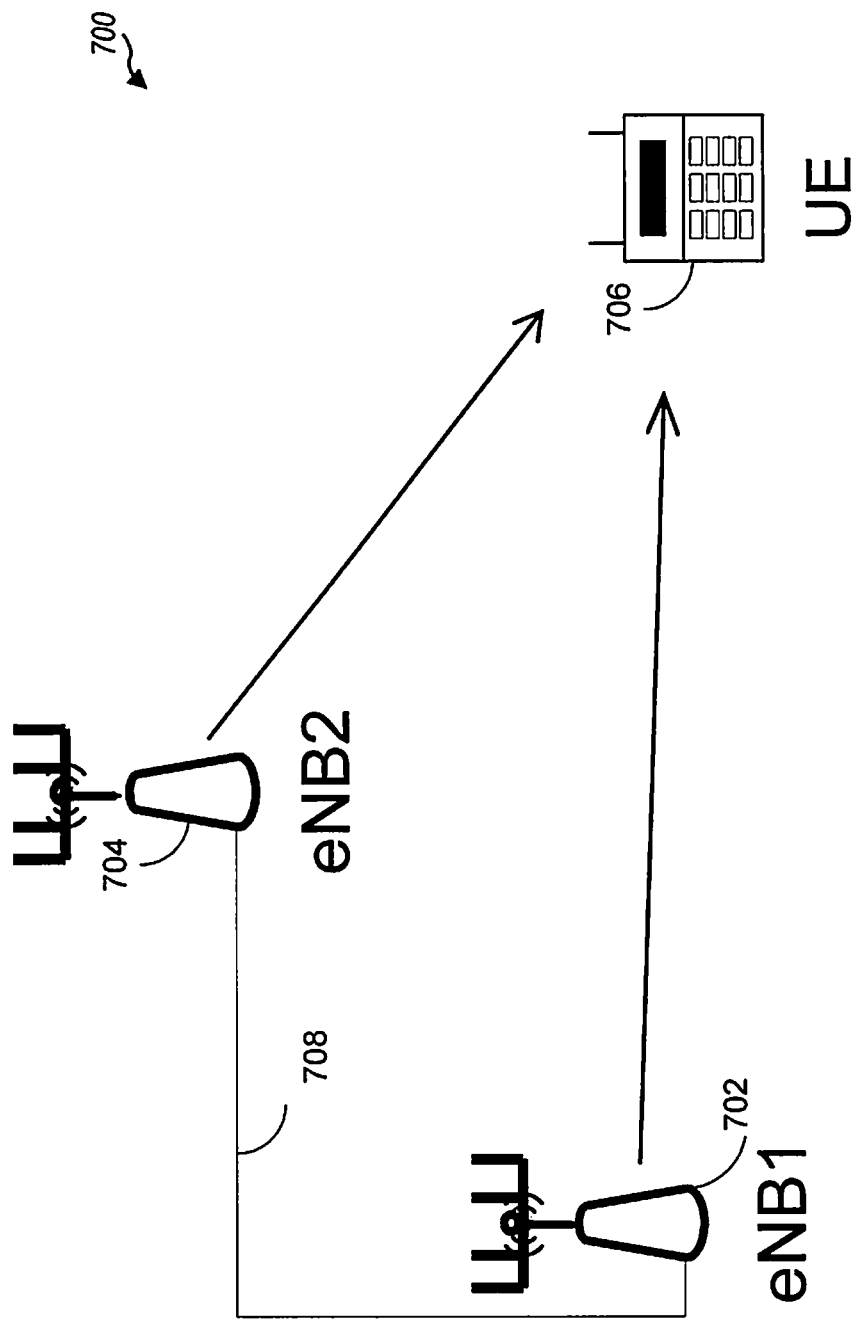
FIG. 7 is a block diagram illustrating a coordinated multipoint (CoMP) transmission according to one aspect of the present disclosure.

Referring to FIG. 7, illustrated is a wireless system 700 that includes eNBs 702, 704 and a UE 706. The eNBs 702, 704 may be geographically separated from one another. An X2 interface 708 may connect the eNBs 702, 704 to each other. The eNBs 702, 704 may be involved in CoMP transmission/reception with the UE 706. One of the eNBs 702, 704 may be referred to as a serving eNB for the UE 706. For CoMP data transmission, the eNBs 702, 704 may coordinate to simultaneously transmit data to the UE 706 on the same time-frequency resource such that the signals can be combined at the UE. It has also been observed that a time offset may exist between the eNB 702 and eNB 704 (e.g., multiple transmission points) that participate in simultaneous coherent downlink transmission to the UE 706. Even though coherent joint CoMP transmission may require inter-phase information, any time offset may lead to phase ramp in the frequency domain. Therefore, accurate time synchronization may be required to alleviate the need for high-subband granularity phase feedback.

It should be noted that while X2 interface 708 is identified with the X2 protocol, any other type of known interfaces used for backhaul signaling and communication may be used. The various aspects of the present disclosure are not limited to implementation of a single type of backhaul interface.

Accordingly, an alternative solution where the UE aids in measuring and reporting the time offset between multiple antennas in MIMO transmission (as depicted in FIG. 6) or in coherent joint CoMP transmission (as depicted in FIG. 7) is proposed as described in detail below.

Figure 8:
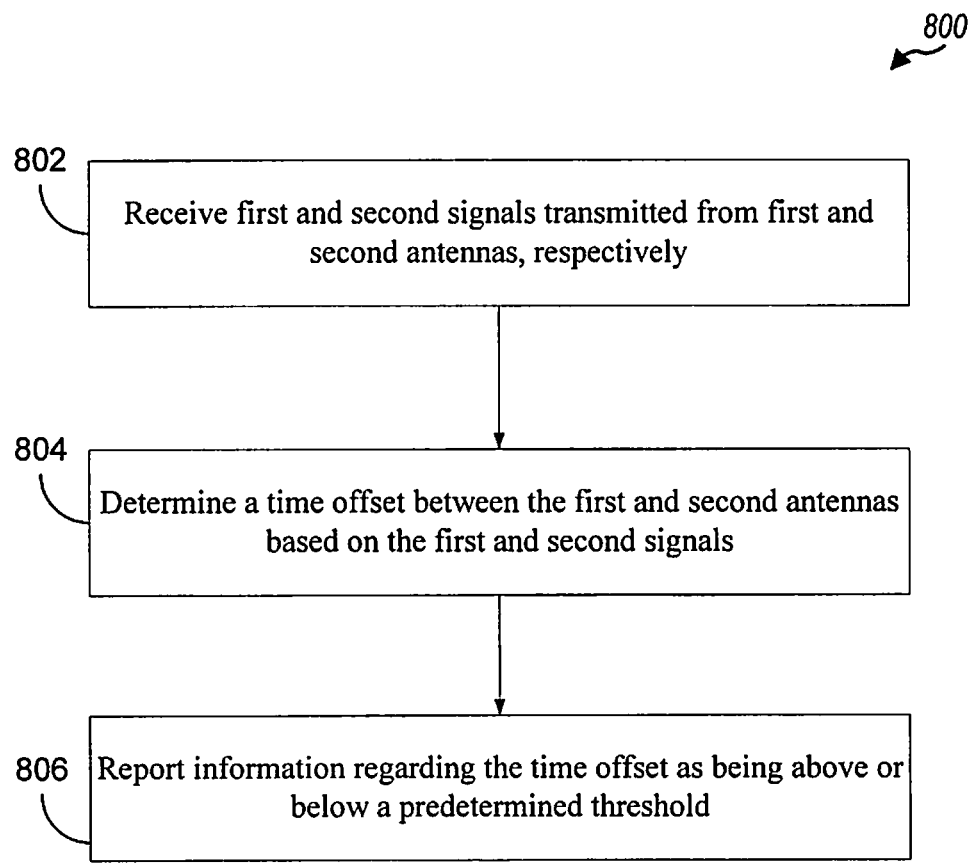
FIG. 8 is flowchart of a method for wireless communication according to one aspect of the present disclosure.

Referring to FIG. 8, illustrated is a flow chart of a method 800 for wireless communication according to one aspect of the present disclosure. The method 800 may be executed by a UE wirelessly communicating in MIMO transmissions with a single transmission point (e.g., single cell/base station) as depicted in FIG. 6, or wireless communicating in CoMP transmission with multiple transmission points (e.g., multiple cells/base stations) as depicted in FIG. 7. The UE may be signaled to provide time offset reports between multiple antennas in MIMO transmission or CoMP transmission. The method 800 begins at block 802 in which first and second signals may be received that were transmitted from first and second antennas, respectively. In an aspect, the first and second antennas may be associated with and belong to a single transmission point. The single transmission point may be a eNB in MIMO transmission to the UE. In another aspect, the first antenna may be associated with a first eNB and the second antenna may be associated with a second eNB. The first and second eNBs may be participating in CoMP transmission to the UE.

The method 800 continues at block 804 in which a time offset between the first and second antennas may be determined. The determination may be based on the first and second signals. The first and second signal may include various reference signals that the UE may use for channel state information, channel estimation, etc. In an aspect, the UE may measure the time offset based on a common reference signal (CRS) (also referred to cell-specific reference signal). In another aspect, the UE may measure the time offset based on a channel state information reference signal (CSI-RS). In yet another aspect, the UE may measure the time offset based on a UE-specific reference signal (UE-RS). In another aspect, a new reference signal may be defined for this purpose. In still another aspect, the UE may use data-aided techniques to determine the time offset.

The method 800 continues with block 806 in which information regarding the time offset may be reported, including information regarding the time offset as being above or below a predetermined threshold. Additionally, the time offset may be reported as a quantized time offset value. Alternatively, the time offset may be reported by a one bit flag that is set/not set if the time offset is above/below the predetermined threshold, and/or if the time offset is outside/within a predetermined range. The predetermined threshold or range may be signaled to the UE or may be specified as part of the LTE Standard. The UE may report the time offset in various ways. In an aspect, the time offset may be sent as part of periodic or aperiodic CSI feedback report. For example, the antenna time offset may be incorporated into an existing CSI reporting structure. In another aspect, the time offset may be sent as part of a reference signal received power (RSRP) report. In yet another aspect, the time offset may be sent as a separate report that is different from already existing feedback reports.

Figure 9:
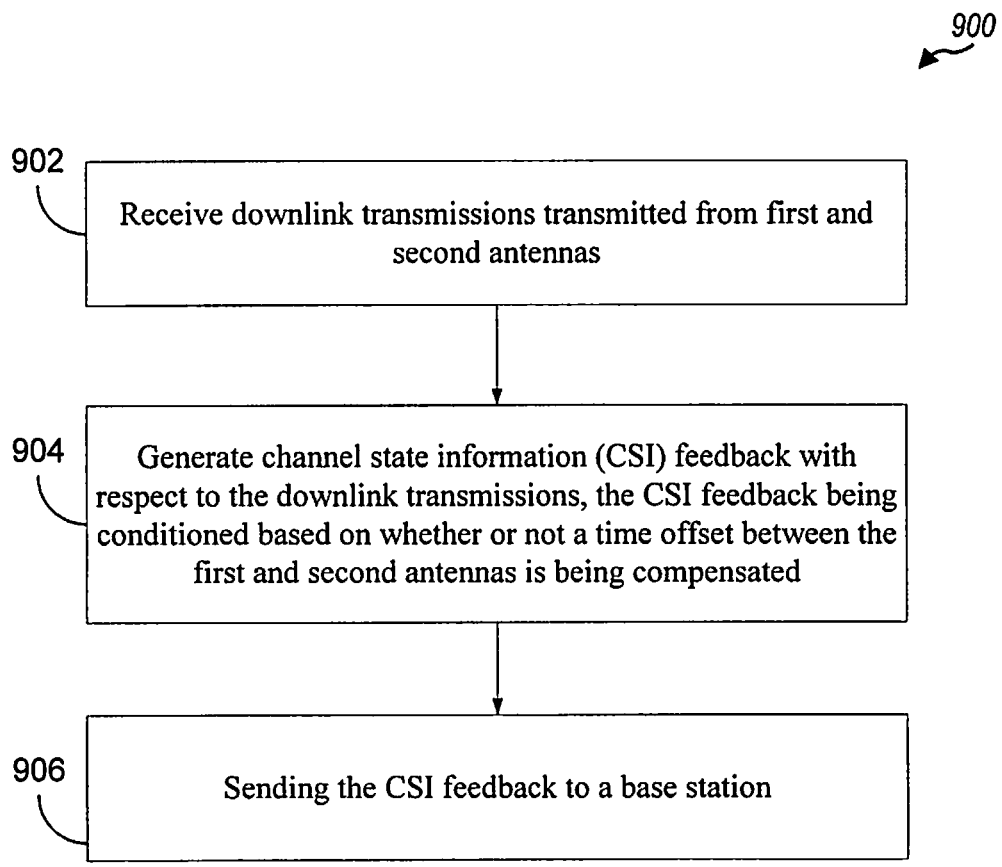
FIG. 9 is a flowchart of another method for wireless communication according to one aspect of the present disclosure.

Referring to FIG. 9, illustrated is a flow chart a method 900 for wireless communication according to one aspect of the present disclosure. The method 900 may be executed by a UE wirelessly communicating in MIMO transmissions with a single transmission point (e.g., single cell/base station) as depicted in FIG. 6, or wireless communicating in CoMP transmission with multiple transmission points (e.g., multiple cells/base stations) as depicted in FIG. 7. The method 900 begins at block 902 in which downlink transmissions may be received that were transmitted from first and second antennas. In an aspect, the first and second antennas may be associated with and belong to a single transmission point. The single transmission point may be an eNB in MIMO transmission to the UE. In another aspect, the first antenna may be associated with a first eNB and the second antenna may be associated with a second eNB. The first and second eNBs may be participating in CoMP transmission to the UE.

The method 900 continues at block 904 in which channel state information (CSI) feedback is generated with respect to the downlink transmissions. The CSI feedback may be conditioned based on whether or the UE assumes that the eNB(s) will be compensating for the antenna time offset. The UE may be signaled this information in various ways. In an aspect, for periodic CSI reports, whether or not the UE should assume the time offset as compensated may be signaled together with the periodic CSI reporting configuration itself. In another aspect, for aperiodic CSI reports, whether or not the UE should assume the time offset as compensated may be included in the grant that is used to request/trigger the aperiodic CSI report. In still another aspect, the assumption may be signaled in other ways such as configured semi-statically by upper layer signaling.

The method 900 continues at block 906 in which the CSI feedback may be sent to a base station. The UE may send the conditioned CSI feedback to the eNB under the assumption that the eNB will be compensating for the reported time offset in its downlink transmissions to the UE.

Figure 10:
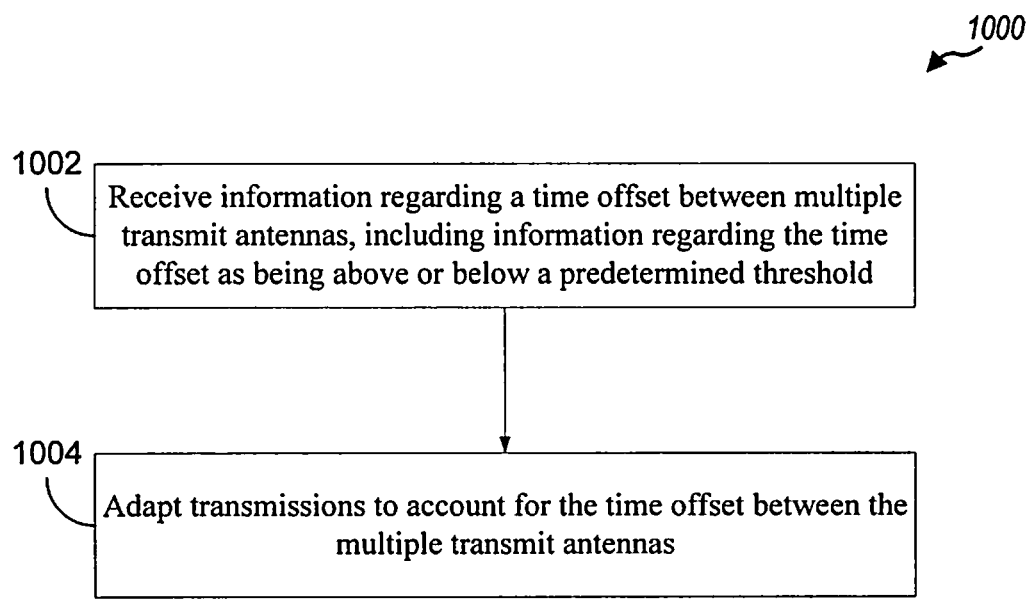
FIG. 10 is a flowchart of yet another method for wireless communication according one aspect of the present disclosure.

Referring to FIG. 10, illustrated is a flow chart of a method 1000 for wireless communication according to one aspect of the present disclosure. The method 1000 may be executed by an eNB wirelessly communicating in MIMO transmissions with a UE as depicted in FIG. 6, or wireless communicating in CoMP transmission with a UE as depicted in FIG. 7. The method 1000 begins at block 1002 in which information regarding a time offset between multiple antennas may be received. The multiple antennas may be associated with a single transmission point, or be associated with multiple transmission points that are geographically separated. As noted above, the UE may send a time offset report in various techniques, and the eNB may receive information regarding the time offset as being above or below a predetermined threshold. In an aspect, the eNB may additionally receive the time offset as a quantized time offset value. In another aspect, the eNB may detect whether a one bit flag (included in a feedback report) has been set/not set indicating that the time offset is above/below the predetermined threshold, and/or is outside/within a predetermined range.

The method 1000 continues at block 1004 in which transmissions may be adapted to account for the time offset between the multiple transmit antennas. The eNB may adapt its transmissions to compensate for the time offset. In an aspect, the eNB may apply a precoder phase rotation to its transmissions. It is noted that the time offset may lead to phase ramp in the frequency domain. Thus, applying the precoder phase rotation at the transmitter can at least partially compensate for this effect. It is also noted that this may impact transmissions that include resource block (RB) bundling where the same precoder is used across bundled RBs. In another aspect, the eNB may offset its timing on a per-UE basis for UEs that use UE-RS for demodulation. In that regard, this adjustment is transparent to the UE.

In another aspect, the eNB may adjust its timing of all signals transmitted by a specific transmission point in accordance with the antenna time offset reported by a plurality of UEs. For example, all UEs within a coverage area of the eNB may report a substantially similar time offset and the eNB may adjust its timing of all signal in view of this. In yet another aspect, the eNB may select a suitable transmission scheme on a per-UE basis to account for the time offset. The eNB may use the reported one-bit flag to enable/disable coherent joint CoMP transmission. For example, in a scenario where the reported one-bit flag was set to indicate that the time offset exceeded a threshold (or the time offset was outside a range), the eNB may decide to disable CoMP transmission.

In still another aspect, various CoMP set configurations may be defined based on the reported time offset. A CoMP set may include a set of eNBs (e.g., cells/transmission points) that may be candidates for CoMP transmission to a UE. The CoMP set may include a CoMP measurement set, a CoMP transmission set, a CoMP cooperating set, or the like. The CoMP measurement set may include all transmission points that can be measured by a UE to possibly participate in CoMP transmission. The transmission points to be included in the CoMP set configuration may be selected based on the reported time offset between the multiple transmission points. The time offset of multiple eNBs may be reported relative to the serving eNB of the UE, or may be reported as between any two eNBs, or may be reported for each eNB as a quantized time offset value, or other technique as disclosed above. In this way, the CoMP set configuration may be adapted to account for the reported time offset.

Figure 11:
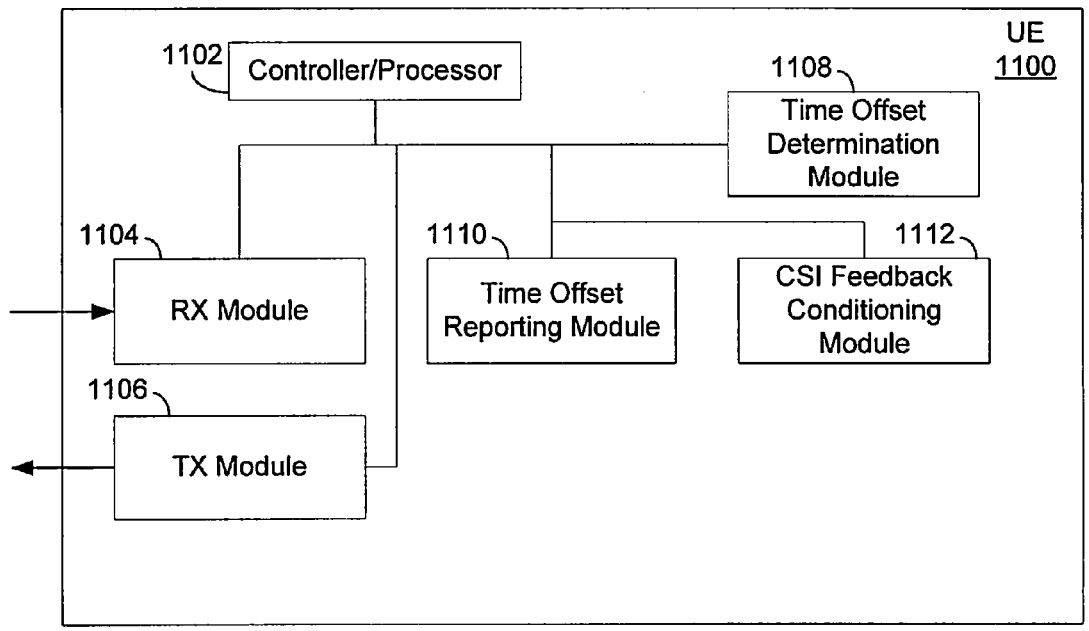
FIG. 11 is a block diagram illustrating a UE configured according to one aspect of the present disclosure.

Referring to FIG. 11 illustrated is a block diagram of a UE 1100 configured according to one aspect of the present disclosure. The UE 1100 may be implemented in the UE 604, 706 of FIGS. 6 and 7, respectively. The UE 1100 includes a controller/processor 1102 that executes, manages, and controls all of its functional aspects. The controller/processor 1102 executes a receiver (RX) module 1104 and a transmit (TX) module 1106. The receiver module 1104 receives messages and transmissions, such as PDCCH and PDSCH from associated eNBs. The receiver module 1104 provides a means for receiving signals from multiple transmit antennas. The UE 1100 further includes a time offset determination module 1108 that is also executed by the controller/processor 1102. The time offset determination module 1108 provides the means for determining a time offset between the multiple transmit antennas based on the received signals. For example, the time offset determination module 1108 may measure various reference signals such as CRS, UE-RS, CSI-RS, or the like in the received signals to determine the time offset.

The controller/processor 1102 also executes a time offset reporting module 1110. The time offset reporting module 1110 provides means for reporting information regarding the time offset between the multiple transmit antennas. The time offset may be reported as a quantized time offset value or may be reported as a one bit flag to indicate that the time offset is above/below a threshold. This information may be reported on the PUCCH and PUSCH via the transmit module 1106 as part of periodic or aperiodic channel state information (CSI) feedback, or as part of a reference signal received power (RSRP) report, or as part of a report that is separate from already existing feedback reports. In certain aspects of the disclosure, based on the determination made by the time offset determination module 1108, the controller/processor 1102 executes a CSI feedback conditioning module 1112 that provides the means for generating CSI feedback that may be conditioned on the assumption that the eNB will correct or compensate for the reported time offset. The UE 1100 may be signaled this assumption in the periodic CSI reporting configuration itself, or included in the grant that is used to request aperiodic CSI report, or configured semi-statically by upper layers.

Figure 12:
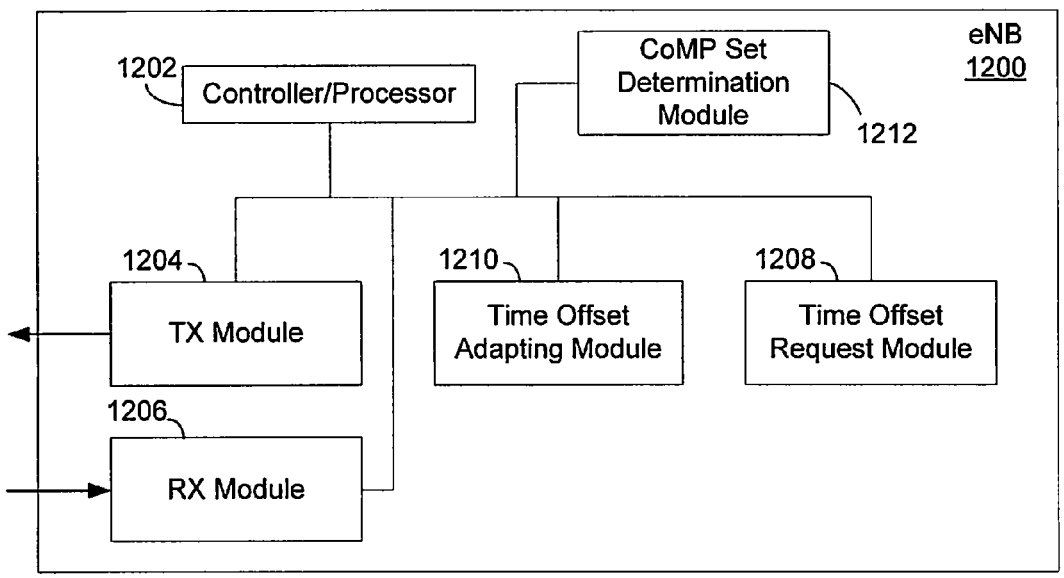
FIG. 12 is a block diagram illustrating an eNB configured according to one aspect of the present disclosure.

Referring to FIG. 12, illustrated is a block diagram of an eNB 1200 configured according to one aspect of the present disclosure. The eNB 1200 may be one of the eNBs 602, 702, 704 of FIGS. 6 and 7, respectively. The eNB 1200 includes a controller/processor 1202 that executes, manages, and controls all of its functional aspects. The controller/processor 1202 executes a transmit (TX) module 1204 and a receiver (RX) module 1206. The eNB 1200 further includes a time offset request module 1208 that provides means for signaling a request to a UE to report a time offset between multiple transmit antennas. The multiple antennas may be associated with a single transmission point, or with multiple transmission points that are geographically separated. This request is transmitted by the downlink transmission module 1204, executed by the controller/processor 1202. In case of a single transmission point, the eNB 1200 may signal which of a plurality of antennas the UE should report the timing offset. In case of multiple transmission points, the eNB 1200 may signal which of a plurality of transmission points or cells the UE should report the timing offset. In this way, the eNB 1200 may receive a time offset report from one or more UEs via the receiver module 1206 which provides means for receiving information regarding a time offset between multiple antennas.

Additionally, the controller/processor 1202 executes a time offset adapting module 1210 which provides means for adapting transmissions to account for the reported time offset. The time offset adapting module 1210 may apply a precoder phase rotation at the transmit module 1204 to at least partially compensate for the time offset. The time offset adapting module 1210 may offset its timing with respect to reference signals such as UE-RS, for UEs that use these reference signals for demodulation. The time offset adapting module 1210 may select a suitable transmission scheme to account for the time offset such as enabling/disabling CoMP transmission (coherent joint transmission) to a UE. The time offset adapting module 1210 may configure a CoMP set based on the antenna timing offset reports by executing a CoMP set determination module 1212. The CoMP set determination module 1212 provides means for defining a CoMP set of cells or transmission points to be included to possibly participate in CoMP transmission to a UE. For example, a serving eNB may select a neighboring eNB that has the smallest time offset relative to its transmit antenna to participate in coherent downlink transmission to the UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 8-12 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both non-transitory computer storage media and communication media including any medium that facilitates transfer of a computer program from one place to another. A non-transitory storage media may be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
receiving first and second signals transmitted from first and second antennas, respectively, wherein the first and second antennas are one of: geographically co-located at a single transmission point, or geographically separated and associated with different transmission points;

determining a time offset between the first and second antennas based on the first and second signals;

receiving information regarding one of: which of a plurality of antennas, or which of a plurality of transmission points, to report the time offset, the plurality of antennas being associated with a base station, the plurality of transmission points being associated with a plurality of base stations; and reporting information regarding the time offset between the first and second antennas, wherein the reporting includes reporting the time offset as being above or below a predetermined threshold.

2. The method of claim 1, wherein the reporting includes reporting the time offset as a quantized time offset value.

3. The method of claim 1, wherein the reporting includes reporting the time offset as being within or outside a predetermined range.

4. The method of claim 1, wherein the predetermined threshold is predetermined for an eNB to disable CoMP transmission.

5. The method of claim 1, wherein the reporting further includes setting a bit flag if the time offset is above the predetermined threshold.

6. The method of claim 1, wherein the reporting includes reporting the time offset as part of a periodic or aperiodic channel state information (CSI) feedback reporting scheme.

7. The method of claim 1, wherein the reporting includes reporting the time offset as part of a reference signal received power (RSRP) report.

8. The method of claim 1, wherein the reporting includes reporting the time offset as a report separate from other feedback reports.

9. The method of claim 1, wherein the determining the time offset includes determining the time offset based on one of a common reference signal (CRS), a channel state information-reference signal (CSI-RS), and a user equipment-specific reference signals (UE-RS).

10. An apparatus for wireless communication, comprising:
means receiving first and second signals transmitted from first and second antennas, respectively, wherein the first and second antennas are one of: geographically co-located at a single transmission point, or geographically separated and associated with different transmission points;

means for determining a time offset between the first and second antennas based on the first and second signals;

means for receiving information regarding one of: which of a plurality of antennas, or which of a plurality of transmission points, to report the time offset, the plurality of antennas being associated with a base station, the plurality of transmission points being associated with a plurality of base stations; and means for reporting information regarding the time offset between the first and second antennas, wherein the reporting includes reporting the time offset as being above or below a predetermined threshold.

11. The apparatus of claim 10, wherein the reporting includes one of:
reporting the time offset as a quantized time offset value;
reporting the time offset as being within or outside a predetermined range;
reporting the time offset as part of a periodic or aperiodic channel state information (CSI) feedback reporting scheme;
reporting includes reporting the time offset as part of a reference signal received power (RSRP) report; and
reporting the time offset as a report separate from other feedback reports.

12. The apparatus of claim 10, wherein the predetermined threshold is predetermined for an eNB to disable CoMP transmission.

13. The apparatus of claim 10, wherein the means for reporting further includes means for setting a bit flag if the time offset is above the predetermined threshold.

14. The apparatus of claim 10, wherein the means for determining the time offset includes means for determining the time offset based on one of a common reference signal (CRS), a channel state information-reference signal (CSI-RS), and a user equipment-specific reference signals (UE-RS).

15. A non-transitory computer-readable medium having program code recorded thereon, the program code comprising:
program code to receive first and second signals transmitted from first and second antennas, respectively, wherein the first and second antennas are one of: geographically co-located at a single transmission point, or geographically separated and associated with different transmission points;

program code to determine a time offset between the first and second antennas based on the first and second signals;

program code to receive information regarding one of: which of a plurality of antennas, or which of a plurality of transmission points, to report the time offset, the plurality of antennas being associated with a base station, the plurality of transmission points being associated with a plurality of base stations; and program code to report information regarding the time offset between the first and second antennas, wherein the information includes information regarding the time offset as being above or below a predetermined threshold.

16. The non-transitory computer-readable medium of claim 15, wherein the program code to report includes one of:
program code to report the time offset as a quantized time offset value;
program code to report the time offset as being within or outside a predetermined range;
program code to report the time offset as part of a periodic or aperiodic channel state information (CSI) feedback reporting scheme;
program code to report the time offset as part of a reference signal received power (RSRP) report; and
program code to report the time offset as a report separate from other feedback reports.

17. The non-transitory computer-readable medium of claim 15, wherein the predetermined threshold is predetermined for an eNB to disable CoMP transmission.

18. The non-transitory computer-readable medium of claim 15, wherein the program code to report further includes program code to set a bit flag if the time offset is above the predetermined threshold.

19. The non-transitory computer-readable medium of claim 15, wherein the program code to determine the time offset includes program code to determine the time offset based on one of a common reference signal (CRS), a channel state information-reference signal (CSI-RS), and a user equipment-specific reference signals (UE-RS).

20. An apparatus configured for wireless communication, comprising
   at least one processor; and
   a memory coupled to the at least one processor, wherein the at least one processor is configured:
      to receive first and second signals transmitted from first and second antennas, respectively, wherein the first and second antennas are one of: geographically co-located at a single transmission point, or geographically separated and associated with different transmission points;
      to determine a time offset between the first and second antennas based on the first and second signals;
      to receive information regarding one of: which of a plurality of antennas, or which of a plurality of transmission points, to report the time offset, the plurality of antennas being associated with a base station, the plurality of transmission points being associated with a plurality of base stations; and
      to report information regarding the time offset between the first and second antennas, wherein the information includes information regarding the time offset as being above or below a predetermined threshold.

21. The apparatus of claim 20, wherein the configuration of the at least one processor to report includes one of:
   configuration to report the time offset as a quantized time offset value;
   configuration to report the time offset as being within or outside a predetermined range;
   configuration to report the time offset as part of a periodic or aperiodic channel state information (CSI) feedback reporting scheme;
   configuration to report the time offset as part of a reference signal received power (RSRP) report; and
   configuration to report the time offset as a report separate from other feedback reports.

22. The apparatus of claim 20, wherein the predetermined threshold is predetermined for an eNB to disable CoMP transmission.

23. The apparatus of claim 20, wherein the configuration of the at least one processor to report further includes configuration to set a bit flag if the time offset is above the predetermined threshold.

24. The apparatus of claim 20, wherein the configuration to determine the time offset includes configuration to determine the time offset based on one of a common reference signal (CRS), a channel state information-reference signal (CSI-RS), and a user equipment-specific reference signals (UE-RS).

25. A method for wireless communication, comprising:
   reporting information regarding one of: which of a plurality of transmit antennas, or which of a plurality of transmission points, to report a time offset between multiple transmit antennas geographically co-located at a single transmission point, or geographically separated and associated with different transmission points, the plurality of transmit antennas being associated with a base station, the plurality of transmission points being associated with a plurality of base stations;
   receiving information regarding the time offset between the multiple transmit antennas, wherein the information includes information regarding the time offset as being above or below a predetermined threshold; and
   adapting transmissions to account for the time offset.

26. The method of claim 25, wherein the adapting includes applying a precoder phase rotation at a transmitter.

27. The method of claim 25, wherein the adapting includes adjusting a timing of a user equipment-specific reference signal (UE-RS) on a per UE basis.

28. The method of claim 25, wherein the receiving includes receiving a plurality of time offset reports from a plurality of UEs,
   wherein the adapting includes adjusting a timing of signals transmitted with the multiple transmit antennas based on the plurality of time offset reports.

29. The method of claim 25, wherein the adapting includes selecting a particular transmission scheme on a per UE basis.

30. The method of claim 29, wherein the selecting includes one of:
   enabling coordinated multipoint (CoMP) transmission if the time offset is below the predetermined threshold; and
   disabling CoMP transmission if the time offset is above the predetermined threshold.

31. The method of claim 25, wherein the adapting includes defining a CoMP set of base stations based on the information regarding the time offset.

32. The method of claim 31, wherein the CoMP set of base stations includes one of a CoMP measurement set, a CoMP transmission set, and a CoMP cooperating set.

33. The method of claim 25, further including transmitting a request to a UE to report the information regarding the time offset.

34. An apparatus for wireless communication, comprising:
   means for reporting information regarding one of: which of a plurality of transmit antennas, or which of a plurality of transmission points, to report a time offset between multiple transmit antennas geographically co-located at a single transmission point, or geographically separated and associated with different transmission points, the plurality of transmit antennas being associated with a base station, the plurality of transmission points being associated with a plurality of base stations;
   means for receiving information regarding the time offset between the multiple transmit antennas, wherein the information includes information regarding the time offset as being above or below a predetermined threshold; and
   means for adapting transmissions to account for the time offset.

35. The apparatus of claim 34, wherein the means for adapting includes means for applying a precoder phase rotation at a transmitter.

36. The apparatus of claim 34, wherein the means for adapting includes means for adjusting a timing of a user equipment-specific reference signal (UE-RS) on a per UE basis.

37. The apparatus of claim 34, wherein the means for receiving includes means for receiving a plurality of time offset reports from a plurality of UEs,
   wherein the means for adapting includes means for adjusting a timing of signals transmitted with the multiple transmit antennas based on the plurality of time offset reports.

38. The apparatus of claim 34, wherein the means for adapting includes means for selecting a particular transmission scheme on a per user equipment (UE) basis.

39. The apparatus of claim 38, wherein the means for selecting includes one of:
   means for enabling coordinated multipoint (CoMP) transmission if the time offset is below the predetermined threshold; and
   means for disabling CoMP transmission if the time offset is above the predetermined threshold.

40. The apparatus of claim 34, wherein the means for adapting includes means for defining a CoMP set of base stations based on the information regarding the time offset.

41. The apparatus of claim 40, wherein the CoMP set of base stations includes one of a CoMP measurement set, a CoMP transmission set, and a CoMP cooperating set.

42. The apparatus of claim 34, further including means for transmitting a request to a UE to report the information regarding the time offset.

43. A non-transitory computer-readable medium having program code recorded thereon, the program code comprising:
   program code to report information regarding one of: which of a plurality of transmit antennas, or which of a plurality of transmission points, to report a time offset between multiple transmit antennas geographically co-located at a single transmission point, or geographically separated and associated with different transmission points, the plurality of transmit antennas being associated with a base station, the plurality of transmission points being associated with a plurality of base stations;
   program code to receive information regarding the time offset between the multiple transmit antennas, wherein the information includes information regarding the time offset as being above or below a predetermined threshold; and
   program code to adapt transmissions to account for the time offset.

44. The non-transitory computer-readable medium of claim 43, wherein the program code to adapt includes one or more of:
   program code to apply a precoder phase rotation at a transmitter; and
   program code to adjust a timing of a user equipment-specific reference signal (UE-RS) on a per UE basis.

45. The non-transitory computer-readable medium of claim 43, wherein the program code to receive includes program code to receive a plurality of time offset reports from a plurality of UEs, wherein the program code to adapt includes program code to adjust a timing of signals transmitted with the multiple transmit antennas based on the plurality of time offset reports.

46. The non-transitory computer-readable medium of claim 43, wherein the program code to adapt includes program code to select a particular transmission scheme on a per UE basis.

47. The non-transitory computer-readable medium of claim 46, wherein the program code to select includes one of:
   program code to enable coordinated multipoint (CoMP) transmission if the time offset is below the predetermined threshold; and
   program code to disable CoMP transmission if the time offset is above the predetermined threshold.

48. The non-transitory computer-readable medium of claim 43, wherein the program code to adapt includes program code to define a CoMP set of base stations based on the information regarding the time offset.

49. The non-transitory computer-readable medium of claim 48, wherein the CoMP set of base stations includes one of a CoMP measurement set, a CoMP transmission set, and a CoMP cooperating set.

50. The non-transitory computer-readable medium of claim 43, further including program code to transmit a request to a UE to report the information regarding the time offset.

51. An apparatus configured for wireless communication, comprising
   at least one processor; and
   a memory coupled to the at least one processor, wherein the at least one processor is configured:
      to report information regarding one of: which of a plurality of transmit antennas, or which of a plurality of transmission points, to report a time offset between multiple transmit antennas geographically co-located at a single transmission point, or geographically separated and associated with different transmission points, the plurality of transmit antennas being associated with a base station, the plurality of transmission points being associated with a plurality of base stations;
      to receive information regarding the time offset between the multiple transmit antennas, wherein the information includes information regarding the time offset as being above or below a predetermined threshold; and
      to adapt transmissions to account for the time offset.

52. The apparatus of claim 51, wherein the configuration of the at least one processor to adapt includes one or more of:
   configuration to apply a precoder phase rotation at a transmitter; and
   configuration to adjust a timing of a user equipment-specific reference signal (UE-RS) on a per UE basis.

53. The apparatus of claim 51, wherein the configuration to receive includes configuration to receive a plurality of time offset reports from a plurality of UEs, wherein the configuration to adapt includes configuration to adjust a timing of signals transmitted with the first and second antennas based on the plurality of time offset reports.

54. The apparatus of claim 51, wherein the configuration to adapt includes configuration to select a particular transmission scheme on a per UE basis.

55. The apparatus of claim 54, wherein the configuration to select includes one of:
   configuration to enable coordinated multipoint (CoMP) transmission if the time offset is below the predetermined threshold; and
   configuration to disable CoMP transmission if the time offset is above the predetermined threshold.

56. The apparatus of claim 51, wherein the configuration to adapt includes configuration to define a CoMP set of base stations based on the information regarding the time offset.

57. The apparatus of claim 56, wherein the CoMP set of base stations includes one of a CoMP measurement set, a CoMP transmission set, and a CoMP cooperating set.

58. The apparatus of claim 51, the at least one processor is further configured to transmit a request to a UE to report the information regarding the time offset.

* * * * *